US010923770B2

(12) United States Patent
Noguchi et al.

(10) Patent No.: US 10,923,770 B2
(45) Date of Patent: Feb. 16, 2021

(54) LITHIUM ION SECONDARY BATTERY

(71) Applicant: NEC Corporation, Tokyo (JP)

(72) Inventors: Takehiro Noguchi, Tokyo (JP); Takuya Hasegawa, Tokyo (JP); Daisuke Kawasaki, Tokyo (JP); Ikiko Shimanuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 16/465,428

(22) PCT Filed: Nov. 30, 2017

(86) PCT No.: PCT/JP2017/043000
§ 371 (c)(1),
(2) Date: May 30, 2019

(87) PCT Pub. No.: WO2018/101391
PCT Pub. Date: Jun. 7, 2018

(65) Prior Publication Data
US 2019/0393554 A1 Dec. 26, 2019

(30) Foreign Application Priority Data
Dec. 2, 2016 (JP) .............................. JP2016-234703

(51) Int. Cl.
*H01M 10/0569* (2010.01)
*H01M 10/0525* (2010.01)
(Continued)

(52) U.S. Cl.
CPC ....... *H01M 10/0569* (2013.01); *H01M 4/134* (2013.01); *H01M 4/5825* (2013.01); *H01M 10/0525* (2013.01)

(58) Field of Classification Search
CPC ......... H01M 10/0525; H01M 10/0568; H01M 10/0569; H01M 10/0585; H01M 4/134;
(Continued)

(56) References Cited

U.S. PATENT DOCUMENTS

2001/0016281 A1  8/2001  Ito
2014/0186722 A1  7/2014  Lim et al.
(Continued)

FOREIGN PATENT DOCUMENTS

JP   2001-176545 A   6/2001
JP   2015-509271 A   3/2015
(Continued)

OTHER PUBLICATIONS

International Search Report for PCT/JP2017/043000 dated Jan. 16, 2018 [PCT/ISA/210].

*Primary Examiner* — Carlos Barcena
(74) *Attorney, Agent, or Firm* — Sughrue Mion, PLLC

(57) ABSTRACT

A purpose of one embodiment of the present invention is to provide a lithium ion secondary battery that has improved life-span characteristics. The first lithium ion secondary battery of the present invention comprises an electrolyte solution comprising a sulfone compound, a fluorinated ether compound and $LiN(FSO_2)_2$, and a negative electrode comprising a silicon material, wherein a content of $LiN(FSO_2)_2$ in the electrolyte solution is more than 5 weight % and 20 weight % or less.

10 Claims, 1 Drawing Sheet

(51) Int. Cl.
*H01M 4/134* (2010.01)
*H01M 4/58* (2010.01)

(58) Field of Classification Search
CPC ...... H01M 4/386; H01M 4/483; H01M 4/505;
H01M 4/525; H01M 4/5825
See application file for complete search history.

(56) References Cited

U.S. PATENT DOCUMENTS

| | | | | |
|---|---|---|---|---|
| 2015/0140443 | A1* | 5/2015 | Takahashi | H01M 4/502 |
| | | | | 429/330 |
| 2015/0303521 | A1* | 10/2015 | Sasaki | H01M 10/0525 |
| | | | | 429/326 |
| 2016/0190648 | A1* | 6/2016 | Park | H01M 10/0567 |
| | | | | 429/332 |
| 2019/0214682 | A1* | 7/2019 | Sakata | H01M 10/0568 |

FOREIGN PATENT DOCUMENTS

| | | |
|---|---|---|
| JP | 2016-001567 A | 1/2016 |
| KR | 10-2015-0019259 A | 2/2015 |
| WO | 2013/183655 A1 | 12/2013 |
| WO | 2014/080870 A1 | 5/2014 |
| WO | 2014/080871 A1 | 5/2014 |
| WO | 2016/143543 A1 | 9/2016 |

\* cited by examiner

LITHIUM ION SECONDARY BATTERY

CROSS REFERENCE TO RELATED APPLICATIONS

This application is a National Stage of International Application No. PCT/JP2017/043000 filed Nov. 30, 2017, claiming priority based on Japanese Patent Application No. 2016-234703 filed Dec. 2, 2016.

TECHNICAL FIELD

The present invention relates to a lithium ion secondary battery, a method for manufacturing the same and a vehicle equipped with the lithium ion secondary battery.

BACKGROUND ART

Lithium ion secondary batteries come to be used for various applications and are required to have excellent life-span characteristics. There is also a demand for batteries with higher energy density than before. One of the means for increasing the energy density is to increase the operating voltage of the battery. However, a battery with high operating voltage has a problem of degradation due to decomposition of the electrolyte solution. In such a case, it is known that electrolyte solvents such as sulfone compounds and fluorinated ether compounds are difficult to be decomposed and are suitable. Patent Document 1 describes that when an electrolyte solution containing a sulfone compound and a fluorinated ether compound is used, even a battery comprising a positive electrode active material operating at a high potential can have good life-span characteristics.

CITATION LIST

Patent Literature

Patent document 1: WO2013/183655

SUMMARY OF INVENTION

Technical Problem

Even in a lithium ion secondary battery with the electrolyte solution of Patent document 1, the decomposition of the electrolyte solution occurs, and there is still a problem that the capacity of the battery is gradually reduced by repeating the charge and discharge cycle. A purpose of one embodiment of the present invention is to provide a lithium ion secondary battery that has improved life-span characteristics.

Solution to Problem

The first lithium ion secondary battery of the present invention comprises an electrolyte solution comprising a sulfone compound represented by formula (1), a fluorinated ether compound represented by formula (2) and LiN(FSO$_2$)$_2$ and a negative electrode comprising a silicon material, wherein a content of LiN(FSO$_2$)$_2$ in the electrolyte solution is more than 5 weight % and 20 weight % or less.

wherein R$_1$" and R$_2$" are each independently a substituted or unsubstituted alkyl group or alkylene group, and in the case of the alkylene group, R$_1$" and R$_2$" are bonded via a single bond or a double bond to form a ring.

$$R_1\text{—O—}R_2 \quad (2)$$

wherein R$_1$ and R$_2$ are each independently an alkyl group, and at least one of R$_1$ and R$_2$ is a fluorine-containing alkyl group.

Advantageous Effects of Invention

According to the present invention, a lithium ion secondary battery that has improved life-span characteristics is provided.

DESCRIPTION OF EMBODIMENTS

Figure 1:
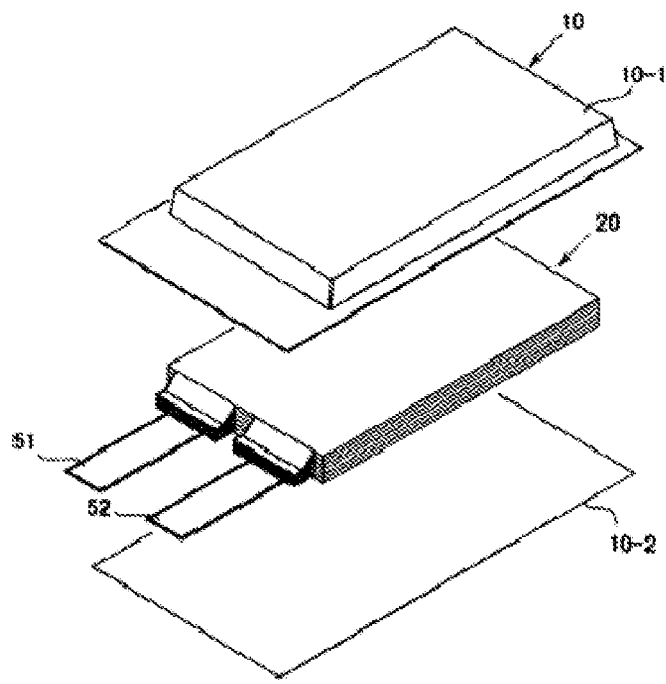
FIG. 1 is an exploded perspective view showing a basic structure of a film package battery.

Hereinafter, one example of the lithium ion secondary battery of the present embodiment will be described for each component.

<Electrolyte Solution>

The electrolyte solution comprises a sulfone compound and a fluorinated ether compound as electrolyte solvents and LiN(FSO$_2$)$_2$ as a supporting salt. Herein, LiN(FSO$_2$)$_2$ may be referred to as LiFSI.

The sulfone compound has the structure of the following formula (1).

wherein R$_1$" and R$_2$" are each independently a substituted or unsubstituted alkyl group or alkylene group, and in the case of the alkylene group, R$_1$" and R$_2$" are bonded via a single bond or a double bond to form a ring.

In formula (1), the carbon number n1 of R$_1$" and the carbon number n2 of R$_2$" are each independently and preferably 1≤n1≤12 and 1≤n2≤12, more preferably 1≤n1≤6 and 1≤n2≤6, and further preferably 1≤n1≤3 and 1≤n2≤3. The alkyl group includes linear alkyl group, branched alkyl group and cyclic alkyl group. When a carbon atom of R$_1$" and a carbon atom of R$_2$" are bonded through a single bond or a double bond, the sulfone compound represented by formula (1) is a cyclic compound. In this case, the total carbon number of R$_1$" and R$_2$" is preferably 2 or more and 12 or less, and more preferably 2 or more and 6 or less.

R$_1$" and R$_2$" may have a substituent, and examples thereof include alkyl group having 1 to 6 carbon atoms such as methyl group, ethyl group, propyl group, isopropyl group, butyl group and isobutyl group; aryl group having 6 to 10 carbon atoms such as phenyl group and naphthyl group; halogen atoms such as chlorine atom, bromine atom, and fluorine atom; and the like.

Examples of sulfone compounds in which R$_1$" and R$_2$" in formula (1) are alkyl group (that is, open chain sulfone compounds) include dimethyl sulfone, ethyl methyl sulfone, diethyl sulfone, butyl methyl sulfone, dibutyl sulfone, methyl isopropyl sulfone, diisopropyl sulfone, methyl tert-butyl sulfone, butyl ethyl sulfone, butyl propyl sulfone, butyl isopropyl sulfone, di-tert-butyl sulfone, diisobutyl sulfone, ethyl isopropyl sulfone, ethyl isobutyl sulfone, tert-butyl ethyl sulfone, propyl ethyl sulfone, isobutyl isopropyl sulfone, butyl isobutyl sulfone and isopropyl (1-methyl-propyl) sulfone.

Examples of sulfone compounds in which $R_1''$ and $R_2''$ in formula (1) are alkylene group (that is, cyclic sulfone compounds) include sulfolane (i.e. tetramethylene sulfone), methylsulfolanes such as 3-methylsulfolane, 3,4-dimethylsulfolane, 2,4-dimethylsulfolane, trimethylene sulfone (thietane 1,1-dioxide), 1-methyl trimethylene sulfone, pentamethylene sulfone, hexamethylene sulfone and ethylene sulfone.

Among these, the sulfone compound is preferably at least one selected from sulfolane, 3-methylsulfolane, dimethyl sulfone, ethyl methyl sulfone, diethyl sulfone, methyl isopropyl sulfone and ethyl isopropyl sulfone.

These sulfone compounds may be used singly or in combination of two or more thereof. In addition, in one aspect of the present embodiment, a cyclic sulfone and an open chain sulfone can be used in combination.

The sulfone compounds are characterized in a comparatively high dielectric constant and have an effect of enabling ready dissociation of an electrolyte supporting salt to increase the electrical conductivity of an electrolyte solution. Also, since the sulfone compounds have high oxidation resistance, they are characterized in hardly generating gas even during high temperature operations. For these reasons, the content of the sulfone compound in the electrolyte solution is preferably 10 weight % or more, more preferably 15 weight % or more and still more preferably 20 weight % or more. On the other hand, since the sulfone compounds have high viscosity, if the concentration thereof is excessively high, there is a problem in that the ion conductivity conversely decreases. For this reason, the content of the sulfone compound in the electrolyte solution is preferably 90 weight % or less, more preferably 80 weight % or less and still more preferably 70 weight % or less.

The fluorinated ether compound has the structure of the following formula (2).

$$R_1\text{—}O\text{—}R_2 \quad (2)$$

wherein $R_1$ and $R_2$ are each independently an alkyl group, and at least one of $R_1$ and $R_2$ is a fluorine-containing alkyl group.

The carbon number of the alkyl group is preferably 1 or more and 5 or less, and more preferably 1 or more and 3 or less.

$R_1$ and $R_2$ may have a substituent, and examples of the substituent include alkyl group having 1 to 6 carbon atoms (for example, methyl group, ethyl group, propyl group, isopropyl group, butyl group and isobutyl group), aryl group having 6 to 10 carbon atoms (for example, phenyl group and naphthyl group) and halogen atoms (for example, chlorine atom, bromine atom and fluorine atom).

Herein, the fluorine-containing alkyl group represents substituted alkyl group having a structure in which at least one hydrogen atom is replaced by a fluorine atom in unsubstituted alkyl group. The fluorine substitution rate of the fluorine-containing alkyl group is preferably 20% or more and 100% or less. This is suitable for the use of a high potential positive electrode because the oxidation resistance of the electrolyte solution is improved as the fluorine substitution amount is increased. If the fluorine substitution amount is too large, the solubility of a supporting salt and the like decreases, and the battery capacity decreases in some cases. The fluorine substitution rate is more preferably 30% or more and 95% or less, and most preferably 40% or more and 90% or less. In formula (2), both of $R_1$ and $R_2$ are preferably fluorine-containing alkyl group because of excellent oxidation resistance. In this specification, the term, "fluorine substitution rate" represents the ratio of the number of fluorine atoms to the total number of hydrogen atoms and fluorine atoms in a fluorine-containing compound (a fluorinated compound) or a functional group comprised in a fluorine-containing compound.

Examples of the fluorinated ether compound include 2,2,3,3,3-pentafluoropropyl 1,1,2,2-tetrafluoroethyl ether, 1,1,2,2-tetrafluoroethyl 2,2,2-trifluoroethyl ether, 1H,1H,2'H,3H-decafluorodipropyl ether, 1,1,2,3,3,3-hexafluoropropyl 2,2-difluoroethyl ether, isopropyl 1,1,2,2-tetrafluoroethyl ether, propyl 1,1,2,2-tetrafluoroethyl ether, 1,1,2,2-tetrafluoroethyl 2,2,3,3-tetrafluoropropyl ether, 1H,1H,5H-perfluoropentyl 1,1,2,2-tetrafluoroethyl ether, 1H-perfluorobutyl 1H-perfluoroethyl ether, methyl perfluoropentyl ether, methyl perfluorohexyl ether, methyl 1,1,3,3,3-pentafluoro-2-(trifluoromethyl)propyl ether, 1,1,2,3,3,3-hexafluoropropyl 2,2,2-trifluoroethyl ether, ethyl nonafluorobutyl ether, ethyl 1,1,2,3,3,3-hexafluoropropyl ether, 1H,1H,5H-octafluoropentyl 1,1,2,2-tetrafluoroethyl ether, 1H,1H,2'H-perfluorodipropyl ether, heptafluoropropyl 1,2,2,2-tetrafluoroethyl ether, methyl nonafluorobutyl ether, 1,1-difluoroethyl 2,2,3,3-tetrafluoropropyl ether, bis(2,2,3,3-tetrafluoropropyl)ether, 1,1-difluoroethyl 2,2,3,3,3-pentafluoropropyl ether, 1,1-difluoroethyl 1H,1H-heptafluorobutyl ether, 2,2,3,4,4,4-hexafluorobutyl difluoromethyl ether, bis(2,2,3,3,3-pentafluoropropyl)ether, nonafluorobutyl methyl ether, bis(1H,1H-heptafluorobutyl)ether, 1,1,2,3,3,3-hexafluoropropyl 1H,1H-heptafluorobutyl ether, 1H-1H-heptafluorobutyl trifluoromethyl ether, 2,2-difluoroethyl 1,1,2,2-tetrafluoroethyl ether, bis(trifluoroethyl)ether, bis(2,2-difluoroethyl)ether, bis(1,1,2-trifluoroethyl)ether, 1,1,2-trifluoroethyl 2,2,2-trifluoroethyl ether and the like.

Among them, from the viewpoint of voltage resistance properties and boiling point, at least one selected from 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H,1H-heptafluorobutyl ether, 1H,1H,2'H,3H-decafluorodipropyl ether, bis(2,2,3,3,3-pentafluoropropyl) ether, 1H,1H,5H-perfluoropentyl 1,1,2,2-tetrafluoroethyl ether, bis(1H,1H-heptafluorobutyl) ether, 1H,1H,2'H-perfluorodipropyl ether, 1,1,2,3,3,3-hexafluoropropyl 1H,1H-heptafluorobutyl ether, 1H-perfluorobutyl 1H-perfluoroethyl ether, bis(2,2,3,3-tetrafluoropropyl) ether is preferred.

The content of the fluorinated ether compound in the electrolyte solution is preferably 10 weight % or more, more preferably 15 weight % or more and most preferably 20 weight % or more. When the content of the fluorinated ether compound is excessively small, the viscosity of the electrolyte solution increases, the conductivity thereof is reduced, and this may cause capacity drop. The content of the fluorinated ether compound in the electrolyte solution is preferably 80 weight % or less, more preferably 75 weight % or less and most preferably 70 weight % or less. When the content of the fluorinated ether compound is excessively large, the dielectric constant of the electrolyte solution is lowered, a supporting salt cannot be dissociated, and this may cause capacity drop.

The total content of the sulfone compound and the fluorinated ether compound in the electrolyte solution is preferably 30 weight % or more and more preferably 60 weight % or more. The total content of the sulfone compound and the fluorinated ether compound in the electrolyte solution is preferably 99 weight % or less and more preferably 95 weight % or less.

The electrolyte solution may comprise other electrolyte solvents than the sulfone compound and the fluorinated ether compound. Examples of other electrolyte solvents include cyclic carbonate compounds and fluorinated carboxylic ester compounds.

Examples of the cyclic carbonate compound may include, but are not particularly limited to, ethylene carbonate (EC), propylene carbonate (PC), butylene carbonate (BC) and vinylene carbonate (VC). A fluorinated cyclic carbonate may be used. Examples of the fluorinated cyclic carbonate may include compounds in which part or the whole of hydrogen atoms of ethylene carbonate (EC), propylene carbonate (PC), butylene carbonate (BC), vinylene carbonate (VC) or the like is substituted by a fluorine atom(s). There can be used, more specifically, for example, 4-fluoro-1,3-dioxolan-2-one (monofluoroethylene carbonate), (cis- or trans-)4,5-difluoro-1,3-dioxolan-2-one, 4,4-difluoro-1,3-dioxolan-2-one and 4-fluoro-5-methyl-1,3-dioxolan-2-one. The cyclic carbonate compound is, among those listed in the above, from the viewpoint of the voltage resistance and conductivity, preferably ethylene carbonate, propylene carbonate, or 4-fluoro-1,3-dioxolan-2-one. The cyclic carbonate can be used singly or concurrently in two or more.

The content of the cyclic carbonate compound in the electrolyte solution is preferably 1 weight % or more and more preferably 2 weight % or more. The content of the cyclic carbonate compound in the electrolyte solution is preferably 80 weight % or less and more preferably 50 weight % or less.

As the fluorinated carboxylic ester compound, a compound having the structure of the following formula (3) is preferred.

$$R_1'\text{—}CO_2\text{—}R_2' \quad (3)$$

wherein $R_1'$ and $R_2'$ are each independently a substituted or unsubstituted alkyl group, and at least one of $R_1'$ and $R_2'$ is a fluorine-containing alkyl group.

In $R_1'$ and $R_2'$ of formula (3), the substituted or unsubstituted alkyl group each independently and preferably has 1 to 7 carbon atoms, and more preferably 1 to 6 carbon atoms.

$R_1'$ and $R_2'$ may have a substituent. Examples of the substituent include alkyl group having 1 to 6 carbon atoms (for example, methyl group, ethyl group, propyl group, isopropyl group, butyl group, isobutyl group), aryl group having 6 to 10 carbon atoms (for example, phenyl group and naphthyl group) and the like.

The fluorine substitution rate of the fluorine-containing alkyl group is preferably 20% or more and 100% or less. This is suitable for the use of a high potential positive electrode because the oxidation resistance of the electrolyte solution is improved as the fluorine substitution amount is increased. If the fluorine substitution amount is too large, the solubility of a supporting salt and the like decreases, and the battery capacity decreases in some cases. The fluorine substitution rate is more preferably 30% or more and 95% or less, and most preferably 40% or more and 90% or less. In formula (3), both of $R_1'$ and $R_2'$ are preferably fluorine containing alkyl group because of excellent oxidation resistance.

Examples of the fluorinated carboxylic ester compound include ethyl pentafluoropropionate, methyl 3,3,3-trifluoropropionate, ethyl 3,3,3-trifluoropropionate, methyl 2,2,3,3-tetrafluoropropionate, 2,2-difluoroethyl acetate, methyl heptafluoroisobutyrate, methyl 2,3,3,3-tetrafluoropropionate, methyl pentafluoropropionate, methyl 2-(trifluoromethyl)-3,3,3-trifluoropropionate, ethyl heptafluorobutyrate, 2,2,2-trifluoroethyl acetate, isopropyl trifluoroacetate, tert-butyl trifluoroacetate, ethyl 4,4,4-trifluorobutyrate, methyl 4,4,4-trifluorobutyrate, butyl 2,2-difluoroacetate, ethyl difluoroacetate, n-butyl trifluoroacetate, 2,2,3,3-tetrafluoropropyl acetate, ethyl 3-(trifluoromethyl)butyrate, methyl tetrafluoro-2-(methoxy)propionate, 3,3,3-trifluoropropyl 3,3,3-trifluoropropionate, methyl difluoroacetate, 2,2,3,3-tetrafluoropropyl trifluoroacetate, 1H,1H-heptafluorobutyl acetate, methyl heptafluorobutyrate, ethyl trifluoroacetate, and the like.

The electrolyte solution comprises $LiN(FSO_2)_2$ as a supporting salt. The lower limit of the content of $LiN(FSO_2)_2$ in the electrolyte solution is more than 5 weight %, preferably 5.5 weight % or more and more preferably 6 weight % or more. When the content of $LiN(FSO_2)_2$ in the electrolyte solution is more than 5 weight %, life-span characteristics of the lithium ion secondary battery is further improved. When the content of $LiN(FSO_2)_2$ in the electrolyte solution is more than 5 weight %, the amount of gas generated in the battery is reduced. The upper limit of the content of $LiN(FSO_2)_2$ in the electrolyte solution is 20 weight % or less, more preferably 15 weight % or less and more preferably 12 weight % or less. When $LiN(FSO_2)_2$ is contained in such a range, life-span characteristics of the battery can be improved.

The electrolyte solution preferably comprises $LiPF_6$ in addition to $LiN(FSO_2)_2$. A small amount of $LiPF_6$ in the electrolyte solution may improve life-span characteristics of the battery in some cases. The upper limit of the ratio of $LiN(FSO_2)_2$ with respect to the total amount of $LiPF_6$ and $LiN(FSO_2)_2$ is preferably 90 mol % or less and more preferably 85 mol % or less.

$LiPF_6$ is a supporting salt generally used in a lithium ion secondary battery, but it reacts with water to generate hydrogen fluoride (HF), which may be a problem in some cases. The hydrogen fluoride generated in the battery may decompose an electrolyte solvent. Decomposition products generated due to this are deposited on the surface of a negative electrode active material such as the silicon material. Also, the hydrogen fluoride may corrode the surface of the silicon material used as the active material. A silicon material with a surface on which the decomposition products are deposited or with a corroded surface is deactivated. As a result, a reaction amount with Li is intensively increased on a portion which has not been deactivated, and thereby the silicon material expands and loses its electrical contact. The deterioration of the battery which is considered to be caused by $LiPF_6$ can be suppressed by replacing at least a portion of the normal used amount of $LiPF_6$ with $LiN(FSO_2)_2$. The lower limit of the ratio of $LiN(FSO_2)_2$ with respect to the total amount of $LiPF_6$ and $LiN(FSO_2)_2$ is preferably 10 mol % or more and more preferably 20 mol % or more.

Other supporting salts may be used in combination with $LiN(FSO_2)_2$ in the electrolyte solution. Examples of other supporting salts include, but are not particularly limited to, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(CF_3SO_2)_2$, $LiN(C_2F_5SO_2)_2$, $LiB_{10}Cl_{10}$, lithium lower aliphatic carboxylates, chloroborane lithium, lithium tetraphenylborate, $LiBr$, $LiI$, $LiSCN$, $LiCl$ and the like.

The total amount of the supporting salt is preferably 0.4 mol or more and 1.5 mol or less, and more preferably 0.5 mol or more and 1.2 mol or less with respect to 1 L of the electrolyte solvent.

<Positive Electrode>

The positive electrode comprises a current collector and a positive electrode mixture layer which is provided on the current collector and comprises a positive electrode active material, a binder and optionally a conductive assisting agent. Examples of the positive electrode active material include, but are not particularly limited to, spinel materials, layered materials, olivine materials and the like.

As the spinel material, the following may be used.

$LiMn_2O_4$;

materials operating around 4V versus lithium obtainable by substituting part of Mn of $LiMn_2O_4$ to increase life, for example, $$LiMn_{2-x}M_xO_4 \qquad (4)$$

(0<x<0.3, and M is a metal element and comprises at least one selected from Li, Al, B, Mg, Si and transition metals);

materials that operate at high voltage around 5 V, such as $LiNi_{0.5}Mn_{1.5}O_4$;

materials having a composition similar to $LiNi_{0.5}Mn_{1.5}O_4$ obtainable by substituting part of the constituent elements of $LiMn_2O_4$ with a transition metal, which can be charged and discharged at high voltage, and materials obtainable by adding another element to these, for example, $$Li_n(M_xMn_{2-x-y}Y_y)(O_{4-w}Z_w) \qquad (5)$$

(0.4≤x≤1.2, 0≤y, x+y<2, 0≤a≤1.2, 0≤w≤1, M is a transition metal element(s) and comprises at least one selected from the group consisting of Co, Ni, Fe, Cr and Cu, Y is a metal element(s) and comprises at least one selected from the group consisting of Li, B, Na, Al, Mg, Ti, Si, K and Ca, and Z is at least one selected from the group consisting of F and Cl); and the like.

In formula (5), M preferably comprises the transition metal element(s) selected from the group consisting of Co, Ni, Fe, Cr and Cu in an amount of 80% or more, more preferably 90% or more, and even 100% of the compositional ratio x. In addition, Y preferably comprises the metal element(s) selected from the group consisting of Li, B, Na, Al, Mg, Ti, Si, K and Ca in an amount of 80% or more, more preferably 90% or more, and even 100% of the compositional ratio y.

The layered material is represented by the general formula, $LiMO_2$ is a metal element(s)), and specific examples thereof include lithium metal composite oxides having a layered structure represented by:

$$LiCo_{1-x}M_xO_2 \qquad (6)$$

wherein 0≤x<0.3, and M is a metal(s) other than Co, $$Li_yNi_{1-x}M_xO_2 \qquad (7)$$

wherein 0≤x≤0.8, 0<y≤1.2 and, M is at least one element selected from the group consisting of Co, Al, Mn, Fe, Ti and B, in particular, $$LiNi_{1-x}M_xO_2 \qquad (8)$$

wherein 0.05<x<0.3, and M is a metal element(s) comprising at least one selected from Co, Mn and Al, or $$Li(Li_xM_{1-x-z}Mn_z)O_2 \qquad (9)$$

wherein 0.1≤x<0.3, 0.33≤z≤0.8, and M is at least one of Fe, Co, Ni, Ti, Al and Mg.

It is preferred that the content of Ni is high, that is, x is less than 0.5, further preferably 0.4 or less in formula (7). Examples of such compounds include $Li_\alpha Ni_\beta Co_\gamma Mn_\delta O_2$ (1≤α≤1.2, β+γ+δ=1, β≥0.6, and γ≤0.2) and $Li_\alpha Ni_\beta Co_\gamma Al_\delta O_2$ (1≤α≤1.2, β+γ+δ=1, β≥0.6, and γ≤0.2) and particularly include $LiNi_\beta Co_\gamma Mn_\delta O_2$ (0.75≤β≤0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, $LiNi_{0.8}Co_{0.1}Al_{0.1}O_2$ and $LiNi_{0.6}Co_{0.2}Mn_{0.2}O_2$ may be preferably used.

From the viewpoint of thermal stability, it is also preferred that the content of Ni does not exceed 0.5, that is, x is 0.5 or more in formula (7). In addition, it is also preferred that particular transition metals do not exceed half. Examples of such compounds include $Li_\alpha Ni_\beta Co_\gamma Mn_\delta O_2$ (1≤α≤1.2, β+γ+δ=1, 0.2≤β≤0.5, 0.1≤γ≤0.4, and 0.1≤δ≤0.4). More specific examples may include $LiNi_{0.4}Co_{0.3}Mn_{0.3}O_2$ (abbreviated as NCM433), $LiNi_{1/3}Cl_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532), $LiNi_{0.4}Mn_{0.4}Co_{0.2}O_2$ (also including those in which the content of each transition metal fluctuates by about 10% in these compounds). In addition, in the region in which the Ni content is small, the crystalline stability is high in a charging state, which makes it possible to set the charging voltage to 4.35 V or higher versus the lithium standard electrode potential.

Examples of the lithium oxide represented by the above formula (9) include $Li(Li_{0.2}Ni_{0.2}Mn_{0.6})O_2$, $Li(Li_{0.15}Ni_{0.3}Mn_{0.55})O_2$, $Li(Li_{0.15}Ni_{0.2}Co_{0.1}Mn_{0.55})O_2$, $Li(Li_{0.15}Ni_{0.15}Co_{0.15}Mn_{0.55})O_2$, $Li(Li_{0.15}Ni_{0.1}Co_{0.2}Mn_{0.55})O_2$ and the like.

The olivine material is represented by the general formula:

$$LiMPO_4 \qquad (10)$$

wherein M is at least one of Co, Fe, Mn and Ni.

Specifically, $LiFePO_4$, $LiMnPO_4$, $LiCoPO_4$, $LiNiPO_4$ and the like may be exemplified, and those in which part of the constituent elements thereof is substituted with another element, for example, those in which the oxygen part thereof is substituted with fluorine can be used. $LiMPO_4$ comprising at least one of Co and Ni in M is a positive electrode material operating at a high potential of 4.5 V or more versus Li, and can increase battery energy density. For this reason, the compositional ratio of Co and/or Ni in M is preferably 80% or more, and materials represented by the following general formula (11) are particularly preferred.

$$LiMPO_4 \qquad (11)$$

wherein M is at least one of Co and Ni.

Besides these, as the positive electrode active materials, NASICON type, a lithium transition metal silicon composite oxide and the like may be used. The positive electrode active material may be used singly, or two or more types thereof may be used in mixture.

$LiN(FSO_2)_2$ may react with the positive electrode active material, generating a gas. Among the above positive electrode active materials, the layered materials having a small amount of gas generation are preferred, and those represented by formula (7) or (9) are especially preferred.

As the positive electrode binders, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like may be used. Besides the above, styrene butadiene rubber (SBR) may be exemplified. When an aqueous binder such as an SBR emulsion is used, a thickener such as carboxymethyl cellulose (CMC) can also be used. The above positive electrode binders may be mixed and used.

The use amount of the binder is preferably 0.5 to 20 parts by weight based on 100 parts by weight of the active material, from the viewpoint of the sufficient binding strength and the high energy density being in a trade-off relation with each other.

For the coating layer containing the positive electrode active material, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the positive electrode current collector, from the viewpoint of electrochemical stability, aluminum, nickel, copper, silver, and alloys thereof are preferred. As the shape thereof, foil, flat plate, mesh and the like are exemplified. In particular, a current collector using aluminum, an aluminum alloy, or iron-nickel-chromium-molybdenum based stainless steel is preferable.

The positive electrode of the present embodiment may be produced, for example, by preparing a slurry comprising the positive electrode active material, the binder and a solvent, and applying this to the positive electrode current collector to form the positive electrode mixture layer.

<Negative Electrode>

The negative electrode comprises a current collector and a negative electrode mixture layer which is provided on the current collector and comprises a negative electrode active material, a binder and optionally a conductive assisting agent.

A material comprising silicon as a constituent element (hereinafter also referred to as a silicon material) is used as a negative electrode active material. Examples of the silicon material include metal silicon, alloys comprising silicon, silicon oxides denoted by the composition formula, $SiO_x$ ($0<x\leq2$) and the like. Other metals contained in the alloy comprising silicon are preferably selected from the group consisting of Li, Al, Ti, Pb, Sn, In, Bi, Ag, Ba, Ca, Hg, Pd, Pt, Te, Zn and La. In the present embodiment, the alloys comprising silicon and the silicon oxides are especially preferred. [0062]

The amount of the silicon material is not particularly limited. The amount of the silicon material is preferably 5 weight % or more, more preferably 70 weight % or more, and may be 100 weight % of the total amount of the negative electrode active material. The negative electrode active material is a material capable of absorbing and desorbing lithium. Herein, the negative electrode active material does not include materials which do not absorb and desorb lithium, such as binders.

The silicon material may be used in combination with other active materials. Especially, the silicon material is preferably used together with carbon. The carbon can alleviate the effect of the expansion and contraction of the silicon material to improve the cycle characteristics of the battery. The silicon material particles and the carbon particles may be mixed and used, or the silicon material particles whose surfaces are coated with carbon may be used. Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

Negative electrode active materials other than carbon, which can be used in combination with the silicon material, also include metals and metal oxides other than silicon. Examples of the metal include Li, Al, Ti, Pb, Sn, In, Bi, Ag, Ba, Ca, Hg, Pd, Pt, Te, Zn, La, and alloys of two or more of these. Also, these metals or alloys may contain one or more non-metal elements. Examples of the metal oxide include aluminum oxide, tin oxide, indium oxide, zinc oxide, lithium oxide, and composites of these. Also, for example, 0.1 to 5 weight % of one or two or more elements selected from nitrogen, boron, and sulfur can be added to the metal oxide. In this way, the electroconductivity of the metal oxide can be enhanced.

The negative electrode binder is not particularly limited, and polyvinylidene fluoride (PVdF), vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamideimide and the like may be used. Also, the negative electrode binder may be a mixture, a copolymer or a cross-linked body of a plurality of the above resins, such as styrene butadiene rubber (SBR). When an aqueous binder such as an SBR emulsion is used, a thickener such as carboxymethyl cellulose (CMC) can also be used.

The amount of the binder is preferably 0.5 to 20 parts by weight based on 100 parts by weight of the active material, from the viewpoint of the sufficient binding strength and the high energy density being in a trade-off relation with each other.

From the viewpoint of improving conductivity, the negative electrode may comprise a conductive assisting agent such as carbonaceous fine particles of graphite, carbon black, acetylene black or the like.

As the negative electrode current collector, from the viewpoint of electrochemical stability, aluminum, nickel, stainless steel, chrome, copper, silver, and alloys thereof may be used. As the shape thereof, foil, flat plate, mesh and the like are exemplified.

The negative electrode of the present embodiment may be produced, for example, by preparing a slurry comprising the negative electrode active material, the binder and a solvent, and applying this to the negative electrode current collector to form the negative electrode mixture layer.

<Separator>

The separator may be of any type as long as it suppresses electron conduction between a positive electrode and a negative electrode, and has durability against the electrolyte solution. Specific examples of a material thereof include polyolefins such as polypropylene and polyethylene, cellulose, polyesters such as polyethylene terephthalate and polybutylene terephtalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of at least one of the positive electrode, the negative electrode and the separator. Examples of a method for forming the insulation layer include a doctor blade method, a dip coating method, a die coater method, a CVD method, a sputtering method, and the like. The insulation layer may be formed at the same time as when the positive electrode, negative electrode or separator is formed. Materials constituting the insulation layer include a mixture of an insulating filler such as aluminum oxide or barium titanate and a binder such as SBR or PVDF.

<Structure of Lithium Ion Secondary Battery>

Figure 2:
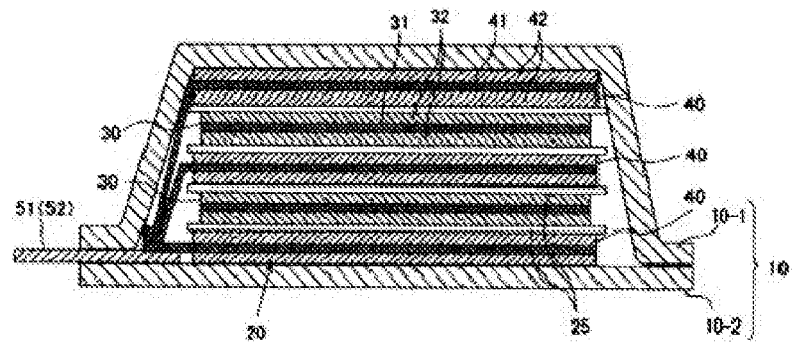
FIG. 2 is a cross-sectional view schematically showing a cross section of the battery of FIG. 1.

The lithium ion secondary battery according to the present embodiment, for example, has a structure as shown in FIGS. 1 and 2. This lithium ion secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present embodiment is not necessarily limited to stacking type batteries and may also be applied to batteries such as a winding type.

As shown in FIGS. 1 and 2, the lithium ion secondary battery may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Lithium Ion Secondary Battery>

The lithium ion secondary battery according to the present embodiment can be manufactured by a conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the lithium ion secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacity and voltage freely. The number of the lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as buses, and trucks, light automobiles, etc.), two-wheeled vehicle (bike) and tricycle), and the like. The vehicles according to the present embodiment is not limited to automobiles, it may be a variety of power source of other vehicles, such as a moving body like a train.

EXAMPLES $Li(Li_{0.18}Ni_{0.25}Mn_{0.57})O_2$ as a positive electrode active material, polyvinylidene fluoride as a binder (3 weight %), carbon black as a conductive assisting agent (3 weight %) were mixed to prepare a positive electrode mixture. The positive electrode mixture was dispersed in N-methyl-2-pyrrolidone to prepare a positive electrode slurry. The positive electrode slurry was uniformly applied to one side of a 20 μm-thick aluminum current collector. The thickness of the coating film was adjusted so that the initial charge capacity per unit area was 4.5 mAh/cm². After drying, the positive electrode was compression-molded using a roll press and finished.

SiO was used as a negative electrode active material. SiO used here was composite particles of Si and $SiO_2$, and the surfaces of the particles were coated with carbon (weight ratio: silicon oxide/carbon=95/5). SiO was dispersed in an N-methyl-2-pyrrolidone solution in which a polyimide binder was dissolved to prepare a negative electrode slurry. The weight ratio of the negative electrode active material and the binder was set to 90/10. The negative electrode slurry was uniformly applied on a 10 μm thick Cu current collector. The thickness of the coating film was adjusted so that the initial charge capacity per unit area was 5.0 mA/cm². Thereafter, a heat treatment at 300° C. was performed.

The positive electrode and the negative electrode cut out into 3 cm×3 cm were disposed to face each other via a separator. As the separator, a 25 μm thick microporous polypropylene film was used.

An electrolyte solution was prepared by mixing a solvent and a support salt. As the solvents, ethylene carbonate (EC), 4-fluoro-1,3-dioxolan-2-one (FEC), ethyl methyl sulfone (EMS), dimethyl sulfone (DMS), ethyl isopropyl sulfone (EiPS), diethyl sulfone (DES), methyl isopropyl sulfone (iPMS), 1,1,2,2-tetrafluoroethyl-2,2,3,3-tetrafluoropropyl ether (FE1), diethyl carbonate (DEC) were used, and as the supporting salts, $LiPF_6$ and $LiN(FSO_2)_2$ (LiFSI) were used. In each example, solvents and supporting salts were mixed at a volume ratio and a concentration described in Tables 1 to 4 to prepare an electrolyte solution.

The positive electrode, the negative electrode, the separator, and the electrolyte solution described above were disposed in a laminate outer package, and the laminate was sealed to prepare a lithium ion secondary battery. The positive electrode and the negative electrode were connected to tabs and electrically connected from the outside of the laminate.

The fabricated battery was charged at 25 mA, and after the voltage reached the upper limit of 4.5 V, the battery was charged at constant voltage until the total charge time reached 2.5 hours. Then the battery was discharged at a constant current of 25 mA until the voltage reached the lower limit of 1.5 V. This charge/discharge was repeated 100 times. During the charge/discharge, the cell was disposed in a thermostat chamber at 45° C. The ratio of the capacity at the $100^{th}$ cycle to the capacity at the 1st cycle was evaluated as capacity retention rate after 100 cycles at 45° C. The results thereof are shown in Table 1.

TABLE 1

| | Electrolyte solution species | | Weight ratio in electrolyte solution (wt %) | | | Capacity retention rate after 100 cycles at 45° C. |
|---|---|---|---|---|---|---|
| | Supporting salt | Solvent (volume ratio) | Sulfone | Fluorinated ether | LiFSI | |
| Comparative example 1 | 1M-LiPF$_6$ | EMS/FE1 = 70/30 | 55.4 | 33.4 | 0 | 3% |
| Comparative example 2 | 0.8M-LiPF$_6$ + 0.2M-LiFSI | EMS/FE1 = 70/30 | 55.3 | 33.2 | 2.7 | 70% |
| Example 1 | 0.6M-LiPF$_6$ + 0.4M-LiFSI | EMS/FE1 = 70/30 | 55.0 | 33.1 | 5.4 | 76% |
| Example 2 | 0.4M-LiPF$_6$ + 0.6M-LiFSI | EMS/FE1 = 70/30 | 54.7 | 32.9 | 8.0 | 81% |
| Comparative example 3 | 1.2M-LiPF$_6$ | EMS/FE1 = 70/30 | 54.3 | 32.7 | 0 | 5% |
| Comparative example 4 | 1M-LiPF$_6$ + 0.2M-LiFSI | EMS/FE1 = 70/30 | 54.1 | 32.5 | 2.7 | 73% |
| Example 3 | 0.8M-LiPF$_6$ + 0.4M-LiFSI | EMS/FE1 = 70/30 | 53.8 | 32.4 | 5.3 | 74% |
| Example 4 | 0.6M-LiPF$_6$ + 0.6M-LiFSI | EMS/FE1 = 70/30 | 53.5 | 32.2 | 7.9 | 77% |
| Example 5 | 0.4M-LiPF$_6$ + 0.8M-LiFSI | EMS/FE1 = 70/30 | 53.3 | 32.0 | 10.4 | 83% |
| Example 6 | 0.2M-LiPF$_6$ + 1M-LiFSI | EMS/FE1 = 70/30 | 53.0 | 31.9 | 13.0 | 83% |
| Comparative example 5 | 1M-LiPF$_6$ | EiPS/FE1 = 60/40 | 46.1 | 43.2 | 0 | 62% |
| Comparative example 6 | 0.8M-LiPF$_6$ + 0.2M-LiFSI | EiPS/FE1 = 60/40 | 55.3 | 33.2 | 2.7 | 74% |
| Example 7 | 0.6M-LiPF$_6$ + 0.4M-LiFSI | EiPS/FE1 = 60/40 | 55.0 | 33.1 | 5.4 | 75% |
| Example 8 | 0.4M-LiPF$_6$ + 0.6M-LiFSI | EiPS/FE1 = 60/40 | 54.7 | 32.9 | 8.0 | 77% |
| Example 9 | 0.2M-LiPF$_6$ + 0.8M-LiFSI | EiPS/FE1 = 60/40 | 54.4 | 32.7 | 10.7 | 77% |
| Comparative example 7 | 0.7M-LiPF$_6$ + 0.3M-LiFSI | EC/EMS/FE1 = 5/45/50 | 33.1 | 51.6 | 3.8 | 78% |
| Example 10 | 0.3M-LiPF$_6$ + 0.7M-LiFSI | EC/EMS/FE1 = 5/45/50 | 32.7 | 51.1 | 8.7 | 83% |
| Example 11 | 0.4M-LiPF$_6$ + 0.8M-LiFSI | EC/EMS/FE1 = 5/55/40 | 40.3 | 41.1 | 10.1 | 82% |
| Example 12 | 0.4M-LiPF$_6$ + 0.8M-LiFSI | FEC/EMS/FE1 = 3/60/37 | 44.3 | 38.4 | 10.1 | 83% |
| Example 13 | 0.4M-LiPF$_6$ + 0.8M-LiFSI | EC/EMS/DMS/FE1 = 3/40/20/37 | 45.0 | 38.1 | 10.1 | 85% |
| Example 14 | 0.4M-LiPF$_6$ + 0.8M-LiFSI | EC/EiPS/FE1 = 5/50/45 | 40.3 | 41.1 | 10.1 | 84% |
| Example 15 | 0.5M-LiPF$_6$ + 0.5M-LiFSI | EC/DES/FE1 = 5/45/50 | 38.0 | 47.4 | 5.8 | 85% |
| Example 16 | 0.5M-LiPF$_6$ + 0.5M-LiFSI | EC/iPMS/FE1 = 5/45/50 | 33.7 | 50.7 | 6.2 | 84% |
| Example 17 | 0.5M-LiPF$_6$ + 0.5M-LiFSI | PC/EMS/FE1 = 10/40/50 | 29.3 | 51.3 | 6.3 | 82% |
| Example 18 | 0.5M-LiPF$_6$ + 0.5M-LiFSI | FEC/EMS/FE1 = 10/40/50 | 28.7 | 50.3 | 6.2 | 78% |
| Comparative example 8 | 0.5M-LiPF$_6$ + 0.5M-LiFSI | EC/EMS/DEC = 5/45/50 | 40.3 | 0 | 7.7 | 72% |

When the content of LiFSI in the electrolyte solution was more than 5 weight %, the capacity retention rate was high as shown in Table 1.

As electrolyte solvents, 1H,1H,2'H,3H-decafluorodipropyl ether (FE2) and bis(2,2,3,3-tetrafluoropropyl)ether (FE3) were further used. A Battery was produced in the same manner as in Example 1 except that an electrolyte solution species described in Table 2 was used, and the evaluation was performed in the same manner.

TABLE 2

| | Electrolyte solution species | | Weight ratio in electrolyte solution (wt %) | | | Capacity retention rate after 100 cycles at 45° C. |
|---|---|---|---|---|---|---|
| | Supporting salt | Solvent (volume ratio) | Sulfone | Fluorinated ether | LiFSI | |
| Example 19 | 0.5M-LiPF$_6$ + 0.5M-LiFSI | EC/EMS/FE1 = 5/45/50 | 32.9 | 51.3 | 6.3 | 83% |

TABLE 2-continued

|  | Electrolyte solution species | | Weight ratio in electrolyte solution (wt %) | | | Capacity retention rate after 100 cycles at 45° C. |
|---|---|---|---|---|---|---|
|  | Supporting salt | Solvent (volume ratio) | Sulfone | Fluorinated ether | LiFSI |  |
| Example 20 | 0.5M-LiPF$_6$ + 0.5M-LiFSI | EC/EMS/FE2 = 5/45/50 | 32.5 | 52.0 | 6.2 | 84% |
| Example 21 | 0.5M-LiPF$_6$ + 0.5M-LiFSI | EC/EMS/FE3 = 5/45/50 | 31.9 | 52.8 | 6.1 | 76% |

A battery was produced in the same manner as in Example 1 except that an electrolyte solution species described in Table 3 was used, and the evaluation of cycle characteristics was performed in the same manner. The number of cycles was set to 150, and the cell volume before the cycles and the cell volume after 150 cycles were compared. The evaluation results of the volume increase amount are shown in Table 3 below. This volume increase indicates the amount of gas generated in the cell.

TABLE 3

|  | Electrolyte solution species | | Weight ratio in electrolyte solution (wt %) | | | Cell volume increase amount after 150 cycles at 45° C. (ml) |
|---|---|---|---|---|---|---|
|  | Supporting salt | Solvent (volume ratio) | Sulfone | Fluorinated ether | LiFSI |  |
| Comparative example 9 | 1.2M-LiPF$_6$ | EMS/FE1 = 70/30 | 54.3 | 32.7 | 0 | 1.8 |
| Comparative example 10 | 1M-LiPF$_6$ + 0.2M-LiFSI | EMS/FE1 = 70/30 | 54.1 | 32.5 | 2.7 | 1.1 |
| Example 22 | 0.6M-LiPF$_6$ + 0.6M-LiFSI | EMS/FE1 = 70/30 | 53.5 | 32.2 | 7.9 | 0.09 |
| Example 23 | 0.4M-LiPF$_6$ + 0.8M-LiFSI | EMS/FE1 = 70/30 | 53.3 | 32.0 | 10.4 | 0.32 |
| Example 24 | 0.2M-LiPF$_6$ + 1M-LiFSI | EMS/FE1 = 70/30 | 53.0 | 31.9 | 13.0 | 0.55 |
| Example 25 | 1.2M-LiFSI | EMS/FE1 = 70/30 | 52.7 | 31.7 | 15.5 | 0.8 |

When the content of LiFSI in the electrolyte solution was more than 5 weight %, it turned out that the volume increase after 150 cycles was small, and less gas was generated in the cell.

A battery was produced in the same manner as in Example 1 except that LiNi$_{0.8}$Co$_{0.15}$Al$_{0.05}$O$_2$ was used as the positive electrode active material, and an electrolyte solution species described in Table 4 was used. The evaluation was performed in the same manner as in Example 1 except that the charge upper limit voltage was 4.2 V and the discharge lower limit voltage was 2.5 V.

Even the battery with LiNi$_{0.8}$Co$_{0.15}$Al$_{0.05}$O$_2$ that is a conventional 4V class positive electrode has the improvement effect of life-span characteristics in the case of containing LiFSI.

The following may also be mentioned as preferred embodiments of the present invention.

(Supplementary Note 1)

A lithium ion secondary battery comprising an electrolyte solution comprising a sulfone compound represented by formula (1), a fluorinated ether compound represented by formula (2) and LiN(FSO$_2$)$_2$, and a negative electrode comprising a silicon material, wherein a content of LiN(FSO$_2$)$_2$ in the electrolyte solution is more than 5 weight %.

$$R_1''\text{—}SO_2\text{—}R_2'' \quad (1)$$

wherein $R_1''$ and $R_2''$ are each independently a substituted or unsubstituted alkyl group or alkylene group, and in the case of the alkylene group, $R_1''$ and $R_2''$ are bonded via a single bond or a double bond to form a ring.

$$R_1\text{—O—}R_2 \quad (2)$$

wherein $R_1$ and $R_2$ are each independently an alkyl group, and at least one of $R_1$ and $R_2$ is a fluorine-containing alkyl group.

TABLE 4

|  | Electrolyte solution species | | Weight ratio in electrolyte solution (wt %) | | | Capacity retention rate after 100 cycles at 45° C. |
|---|---|---|---|---|---|---|
|  | Supporting salt | Solvent (volume ratio) | Sulfone | Fluorinated ether | LiFSI |  |
| Comparative example 11 | 1M-LiPF$_6$ | EC/DEC = 30/70 | 0 | 0 | 0 | 88% |
| Example 26 | 0.5M-LiPF$_6$ + 0.5M-LiFSI | EC/EMS/FE1 = 5/55/40 | 32.5 | 52.0 | 6.2 | 94% |

(Supplementary Note 2)

The lithium ion secondary battery according to supplementary note 1, wherein the electrolyte solution comprises $LiPF_6$.

(Supplementary Note 3)

The lithium ion secondary battery according to supplementary note 2, wherein a ratio of $LiN(FSO_2)_2$ with respect to a total amount of $LiPF_6$ and $LiN(FSO_2)_2$ is 10 mol % or more and 90 mol % or less.

(Supplementary Note 4)

The lithium ion secondary battery according to any one of supplementary notes 1 to 3, wherein the lithium ion secondary battery comprises a positive electrode comprising a layered lithium oxide represented by formula (3) or formula (4).

$$Li_yNi_{1-x}M_xO_2 \quad (3)$$

wherein $0 \leq x \leq 0.8$, $0 < y \leq 1.2$ and M is at least one element selected from the group consisting of Co, Al, Mn, Fe, Ti and B.

$$Li(Li_xM_{1-x-z}Mn_z)O_2 \quad (4)$$

wherein $0.1 \leq x < 0.3$, $0.33 \leq z \leq 0.8$, and M is at least one of Fe, Co, Ni, Ti, Al and Mg.

(Supplementary Note 5)

The lithium ion secondary battery according to any one of supplementary notes 1 to 4, wherein a content of the fluorinated ether compound in the electrolyte solution is 20 weight % or more and 80 weight % or less.

(Supplementary Note 6)

The lithium ion secondary battery according to any one of supplementary notes 1 to 5, wherein a content of the sulfone compound in the electrolyte solution is 15 weight % or more and 70 weight % or less.

(Supplementary Note 7)

The lithium ion secondary battery according to any one of supplementary notes 1 to 6, wherein the silicon material is SiO or an Si alloy.

(Supplementary Note 8)

The lithium ion secondary battery according to any one of supplementary notes 1 to 7, wherein the sulfone compound is selected from the group consisting of sulfolane, 3-methylsulfolane, dimethyl sulfone, ethyl methyl sulfone, diethyl sulfone, methyl isopropyl sulfone, and ethyl isopropyl sulfone.

(Supplementary Note 9)

The lithium ion secondary battery according to any one of supplementary notes 1 to 8, wherein the fluorinated ether compound is at least one selected from 1,1,2,2-tetrafluoroethyl 2,2,3,3-tetrafluoropropyl ether, 2,2,3,4,4,4-hexafluorobutyl difluoromethyl ether, 1,1-difluoroethyl 2,2,3,3-tetrafluoropropyl ether, 1,1,2,3,3,3-hexafluoropropyl 2,2-difluoroethyl ether, 1,1-difluoroethyl 1H,1H-heptafluorobutyl ether, 1H-1H,2'H,3H-decafluorodipropyl ether, bis(2,2,3,3,3-pentafluoropropyl) ether, 1H,1H,5H-perfluoropentyl 1,1,2,2-tetrafluoroethyl ether, bis(1H,1H-heptafluorobutyl) ether, 1H,1H,2'H-perfluorodipropyl ether, 1,1,2,3,3,3-hexafluoropropyl 1H,1H-heptafluorobutyl ether, 1H-perfluorobutyl 1H-perfluoroethyl ether, bis(2,2,3,3-tetrafluoropropyl) ether.

(Supplementary Note 10)

A vehicle equipped with the lithium ion secondary battery according to any one of supplementary notes 1 to 9.

(Supplementary Note 11)

A method for manufacturing a lithium ion secondary battery, comprising the steps of:

fabricating an electrode element by stacking a positive electrode and a negative electrode via a separator, and encapsulating the electrode element and an electrolyte solution into an outer package, wherein the electrolyte solution comprises a sulfone compound represented by formula (1), a fluorinated ether compound represented by formula (2) and $LiN(FSO_2)_2$, wherein a content of $LiN(FSO_2)_2$ in the electrolyte solution is more than 5 weight %, and the negative electrode comprises a silicon material.

$$R_1''-SO_2-R_2'' \quad (1)$$

wherein $R_1''$ and $R_2''$ are each independently a substituted or unsubstituted alkyl group or alkylene group, and in the case of the alkylene group, $R_1''$ and $R_2''$ are bonded via a single bond or a double bond to form a ring.

$$R_1-O-R_2 \quad (2)$$

wherein $R_1$ and $R_2$ are each independently an alkyl group, and at least one of $R_1$ and $R_2$ is a fluorine-containing alkyl group.

This application claims priority right based on Japanese patent application No. 2016-234703, filed on Dec. 2, 2016, the entire disclosure of which is hereby incorporated by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention.

INDUSTRIAL APPLICABILITY

The electrode and the lithium ion secondary battery with the electrode according to the present invention can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS

10 film package
20 battery element
25 separator
30 positive electrode
40 negative electrode

The invention claimed is:

1. A lithium ion secondary battery comprising an electrolyte solution comprising a sulfone compound represented by formula (1), a fluorinated ether compound represented by formula (2) and $LiN(FSO_2)_2$, and a negative electrode comprising a silicon material, wherein a content of $LiN(FSO_2)_2$ in the electrolyte solution is more than 5 weight % and 20 weight % or less, $$R_1''-SO_2-R_2'' \quad (1)$$

wherein $R_1''$ and $R_2''$ are each independently a substituted or unsubstituted alkyl group or alkylene group, and in the case of the alkylene group, $R_1''$ and $R_2''$ are bonded via a single bond or a double bond to form a ring, $$R_1\text{—}O\text{—}R_2 \tag{2}$$

wherein $R_1$ and $R_2$ are each independently an alkyl group, and at least one of $R_1$ and $R_2$ is a fluorine-containing alkyl group.

2. The lithium ion secondary battery according to claim 1, wherein the electrolyte solution comprises $LiPF_6$.

3. The lithium ion secondary battery according to claim 2, wherein a ratio of $LiN(FSO_2)_2$ with respect to a total amount of $LiPF_6$ and $LiN(FSO_2)_2$ is 10 mol % or more and 90 mol % or less.

4. The lithium ion secondary battery according to claim 1, wherein the lithium ion secondary battery comprises a positive electrode comprising a layered lithium oxide represented by formula (3) or formula (4), $$Li_yNi_{1-x}M_xO_2 \tag{3}$$

wherein $0 \le x \le 0.8$, $0 < y \le 1.2$ and M is at least one element selected from the group consisting of Co, Al, Mn, Fe, Ti and B, $$Li(Li_xM_{1-x-z}Mn_z)O_2 \tag{4}$$

wherein $0.1 \le x < 0.3$, $0.33 \le z \le 0.8$, and M is at least one of Fe, Co, Ni, Ti, Al and Mg.

5. The lithium ion secondary battery according to claim 1, wherein a content of the fluorinated ether compound in the electrolyte solution is 20 weight % or more and 80 weight % or less.

6. The lithium ion secondary battery according to claim 1, wherein a content of the sulfone compound in the electrolyte solution is 15 weight % or more and 70 weight % or less.

7. The lithium ion secondary battery according to claim 1, wherein the silicon material is an alloy comprising silicon or a silicon oxide.

8. The lithium ion secondary battery according to claim 1, wherein the sulfone compound is at least one selected from sulfolane, 3-methylsulfolane, dimethyl sulfone, ethyl methyl sulfone, diethyl sulfone, methyl isopropyl sulfone, and ethyl isopropyl sulfone.

9. A vehicle equipped with the lithium ion secondary battery according to claim 1.

10. A method for manufacturing a lithium ion secondary battery, comprising the steps of:
fabricating an electrode element by stacking a positive electrode and a negative electrode via a separator, and
encapsulating the electrode element and an electrolyte solution into an outer package,
wherein the electrolyte solution comprises a sulfone compound represented by formula (1), a fluorinated ether compound represented by formula (2) and $LiN(FSO_2)_2$, wherein a content of $LiN(FSO_2)_2$ in the electrolyte solution is more than 5 weight % and 20 weight % or less, and the negative electrode comprises a silicon material, $$R_1''\text{—}SO_2\text{—}R_2'' \tag{1}$$

wherein $R_1''$ and $R_2''$ are each independently a substituted or unsubstituted alkyl group or alkylene group, and in the case of the alkylene group, $R_1''$ and $R_2''$ are bonded via a single bond or a double bond to form a ring, $$R_1\text{—}O\text{—}R_2 \tag{2}$$

wherein $R_1$ and $R_2$ are each independently an alkyl group, and at least one of $R_1$ and $R_2$ is a fluorine-containing alkyl group.

* * * * *